United States Patent [19]

Yananton

[11] Patent Number: 4,469,046

[45] Date of Patent: Sep. 4, 1984

[54] ODORLESS ANIMAL LITTER UNIT

[76] Inventor: Patrick Yananton, 1518 Little Hill Rd., Point Pleasant, N.J. 98762

[21] Appl. No.: 315,307

[22] Filed: Oct. 27, 1981

Related U.S. Application Data

[63] Continuation-in-part of Ser. No. 909,256, May 24, 1978.

[51] Int. Cl.³ .............................................. A01K 29/00
[52] U.S. Cl. ........................................................ 119/1
[58] Field of Search ......................... 119/1; 128/132 D

[56] References Cited

U.S. PATENT DOCUMENTS

| | | | |
|---|---|---|---|
| 2,306,014 | 12/1942 | Carson | 119/1 |
| 2,971,493 | 2/1961 | Robb | 119/1 |
| 3,476,083 | 11/1969 | Vander Wall | 119/1 |
| 3,521,624 | 7/1970 | Gander et al. | 128/132 D |
| 3,626,899 | 12/1971 | Spellman | 119/1 |
| 3,752,120 | 8/1973 | Pallesi | 119/1 |
| 3,752,121 | 8/1973 | Brazzell | 119/1 |
| 3,831,557 | 8/1974 | Elesh | 119/1 |
| 4,308,825 | 1/1982 | Stepanian | 119/1 |
| 4,325,325 | 4/1982 | Larter | 119/1 |

Primary Examiner—Gene Mancene
Assistant Examiner—Kris R. Schulze
Attorney, Agent, or Firm—Sheldon H. Parker

[57] ABSTRACT

The odor preventing animal litter unit employs the use of a pad consisting of a non-absorbent film, a very absorbent pad treated with a buffer and other antibacterial, bacteriocidal compounds and a protective ripproof screening, which can be used in a specifically designed container or in independent containers. The chemical additives and absorbent material prevent the urine odor and the non-absorbent film prevents leakage during disposal. The ripproof screen prevents animal accessability to the inner pad materials. The complete pad unit is disposable.

6 Claims, 7 Drawing Figures

ODORLESS ANIMAL LITTER UNIT

CROSS REFERENCE TO RELATED APPLICATION

This application is a continuation-in-part of the pending patent application Ser. No. 909,256, filed May 24, 1978, the subject matter and description of which is incorporated herein by reference thereto, as though set forth herein in detail.

BACKGROUND OF THE INVENTION

1. Field of the Invention

This invention relates to improvements in a unique odor preventing, disposable, absorbent pad-liner for an animal litter units, and more particularly to an improved combination of mesh screening and absorbent padding with a plastic liner to be utilized in combination with the described custom box or independent holders.

2. Brief Description of the Prior Art

Many domestic animals frequently use litter boxes for the elimination of body wastes. The boxes are usually filled with various kinds of absorbent granular materials such as sand, cat litter, and the like, and must be periodically emptied and cleaned, which are somewhat objectional tasks, since the absorbent granular material must be replaced and the boxes cleaned each time.

Cats, being the most frequent users of litter boxes, present a further problem in that the urine of the feline contains the highest content of urea which, when allowed to stand for any length of time in any absorbent material, releases an ammonia odor. This odor is one of the more objectional factors in the ownership of a cat.

In order to eliminate the odor caused by cat urine, the litter box must be changed frequently, this being an expensive, laborious and messy job.

Many patents have issued on devices for the indoor use by cats, such as U.S. Pat. No. 3,233,588. The invention disclosed in this patent employs the use of a screen which is placed on top of the cat litter. This patent does ease the problem of animal excrement, by merely lifting the screen and disposing of the feces lying on top, it does not however, contend with the problem of the odor created by the urine. The unit must be periodically emptied of its absorbent granules and thus only partly contents with the elimination of the mess and labor involved. U.S. Pat. No. 3,809,013 is similar, except that a stack of liners is placed under the litter. When the litter becomes soiled, the liner is lifted, the litter filters through screen covered holes in the center of the liner and the litter is reused with the next liner. Again, the excrement is disposed of neatly, however the odor problem remains.

U.S. Pat. No. 3,284,273 discloses an absorbent pad which can be used in combination with animals. Although this pad does contain absorbent capabilities, the odor from the urine of the animal is trapped, much as in the standard cat litter. The pad is not designed for repetitive, long-term use in a cat box but rather to retain the urine in a disposable pad, by mopping up pools of urine left on floors or in cages, etc.

U.S. Pat. No. 3,476,083 discloses the use of deodorizing substances which are placed in the bottom of the receptacle. A screen is placed a short distance above, on which lies the standard kitty litter. The upper compartment receives the solid and liquid excretia, retains the solids and absorbs the bulk of the liquid allowing the excess liquids to drain through to the lower compartment. Although providing some neutralizing of the ammonia odor by deodorizing the urine which cannot be absorbed by the litter, it does not provide an effective means for deodorizing the bulk of the urine which has been trapped in the litter. The disposal of all the litter creates a substantial expense to the owner and the cleaning of the lower compartment would be unpleasantly laborious and rather messy. The spilling of the deodorizing substances (lime is suggested) would be objectional as well as possibly harmful to the person handling the container if by chance some of the chemical substance was to come in contact with the skin.

While many additional patents could be cited regarding other variations of disposal systems, types of granular litter and containers none of these patents overcome both the problems of odor and easy, economical and convenient disposal and replacement.

SUMMARY OF THE INVENTION

In the instant invention the foregoing complications are overcome and an easy to use, odorless, disposable animal litter box is produced. The odorless animal litter box includes a specifically designed box-like container, reusable granules, a non-absorbent liner, an absorbent pad, chemically treated with buffers and antibacterial compounds, with a protective screening.

BRIEF DESCRIPTION OF THE DRAWINGS

The advantages and objects of the invention will become apparent and the invention will be more fully understood from the following specification, particularly when read in conjunction with the drawings, wherein.

DETAILED DESCRIPTION OF THE INVENTION

Figure 1:
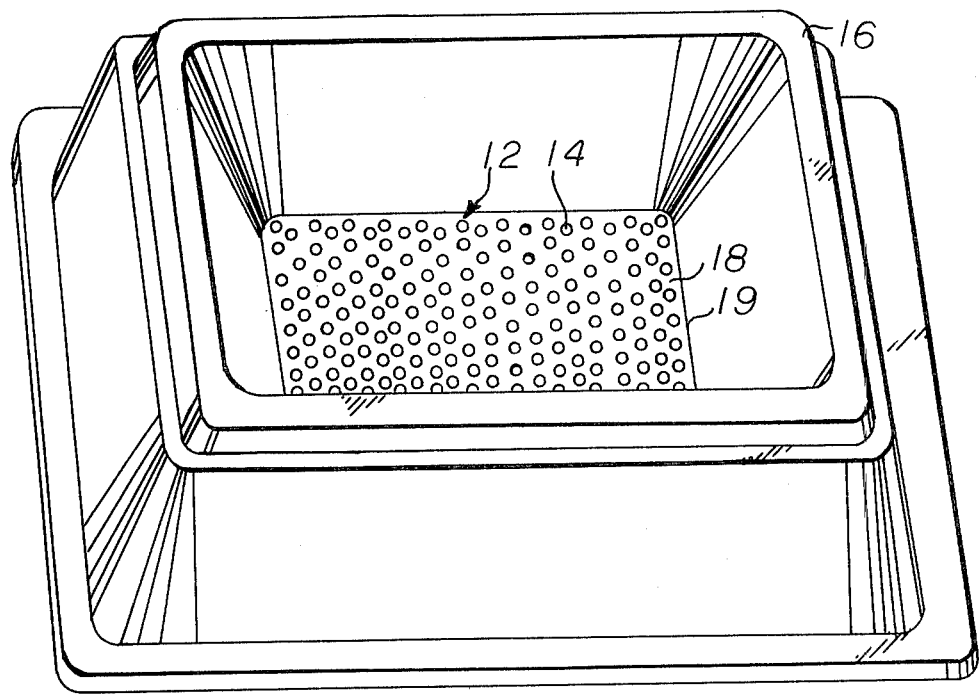
FIG. 1 is a top perspective of the assembled unit in accordance with the present invention.

FIG. 1 illustrates, through a top perspective view, the assembled unit 10 of the instant invention. The outer shell unit 16 is slipped over the inner shell unit 44, shown in FIG. 4, locking the absorbent unit 12 in place. The non-absorbent granular material 20, which is placed on top of the absorbent unit 12 to provide the animal with the necessary scratching materials, if so required. The granular material would not be required if the unit was being used for a dog or other animal which did not have the scratching instinct.

In the modification FIG. 1, the screen 19 is formed as an integral part of the outer shell unit 16. A large number of holes 14 are provided in order to permit the free passage of urine from the region above the screen to the absorbent layer below.

Figure 2:
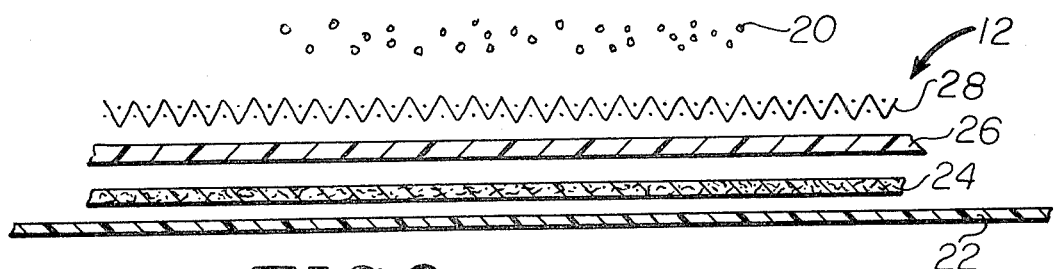
FIG. 2 is an exploded fragmentary view of the absorbent pad of the instant invention.
Figure 7:
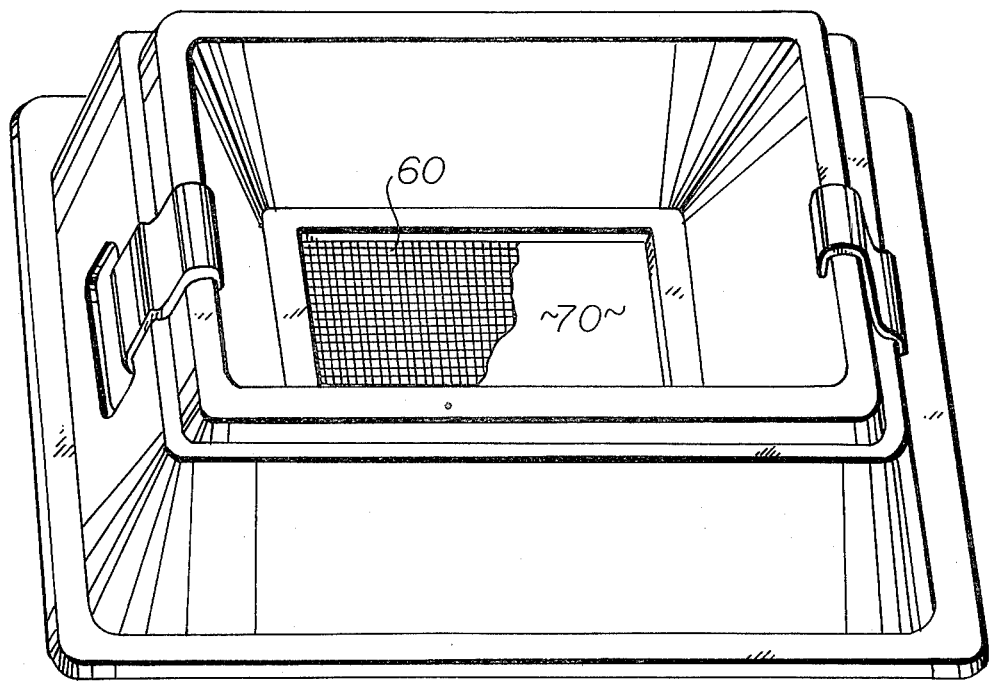
FIG. 7 is a fragmentary top perspective view of an embodiment of the instant invention which employes a locking mechanism.

FIG. 2 shows, in exploded form, a cross-section of the layers which form the absorbent unit 12. The protective layer 22 which is a thin plastic sheet of a material such as poly propylene, prevents waste from making contact with the box and doubles as a bag when disposing of the soiled litter. The sorbent layer 24 is formed from a super absorbent material such as manufactured by Dow Chemical and marketed under U.S. Pat. No. 4,117,184. The instant patent application incorporates by reference thereto, as though set forth in detail herein the description in U.S. Pat. No. 4,117,184 of a product commonly identified as a superabsorbent and sold by Dow Chemical Company under the designation DWAL 35 R. The Dow Chemical product is available as a laminate which includes at least a tissue layer and a polymer film layer. The Dow Chemical laminate has an indicated minimum liquid absorbency capacity of 28 grams per gram of laminate.

Alternatively, the super absorbent can be a material such as the National Starch and Chemical Corporation product sold under the registered trademark PERMASORB. The National Starch product is a hydrophilic acrylic which has the ability to absorb and hold urine. There is a significant reduction in urine odor and pH level in the presence of PERMASORB.

The protective layer 26 is made from a durable, nonwoven tissue substance. In addition to the protective layer 26, there can be an additional layer of either a hydrophobic or hydrophilic material. If a binder is used for either the fabric of the tissue layer or other layer, it must be of a non-water soluable material. The protective screen 28 is of a flexiable, durable substance which prevents the animal from scratching through to the bottom layers. The screen can be formed from any substance which allow for the passage of urine to the sorbent layer 24 while being strong enough that the animal cannot rip through it. The protective layer 26 is described in greater detail in association with FIG. 6. The granular material 20 is placed on top of the absorbent unit as previously described herein.

Figure 3:
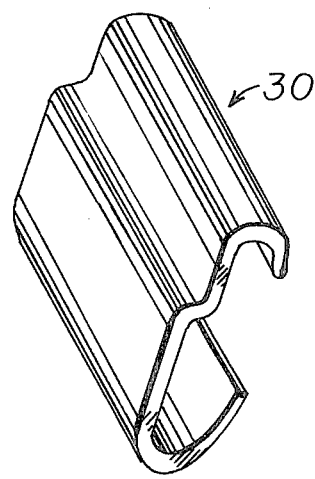
FIG. 3 is a perspective view of a locking handle for use with the embodiment of the invention shown in FIG. 7.
Figure 5:
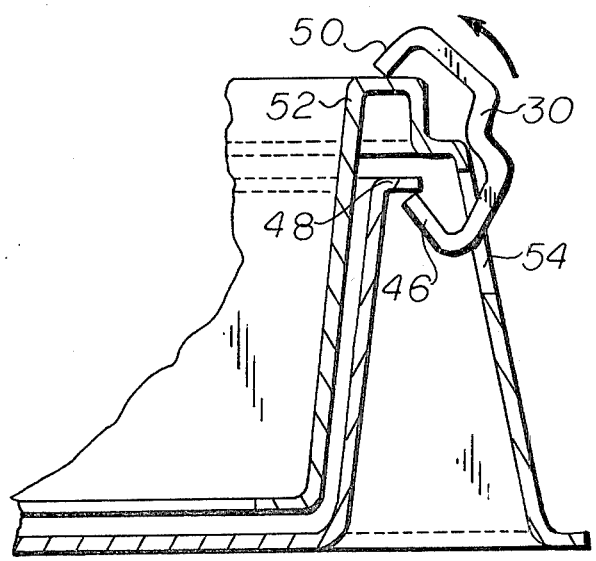
FIG. 5 is a perspective view of an assembled unit with the handle in the initial position prior to being locked.
Figure 4:
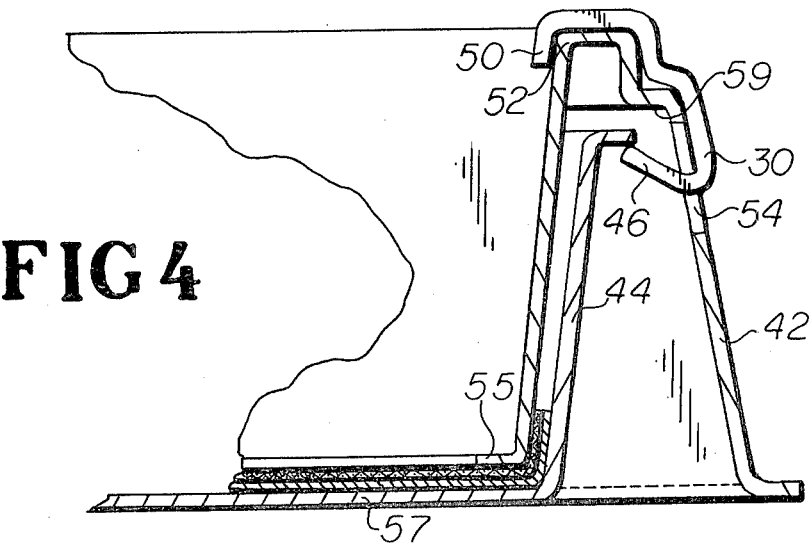
FIG. 4 is a perspective view of an assembled unit with the handle in the locked position.

FIG. 3 illustrates the locking handle 30, the contour of which should conform to that of the outer shell unit 42, as seen in FIG. 4. The outer shell unit 42 has been placed over the inner shell unit 44, locking the absorbent unit 12 in place. The locking handle 30 bottom edge 46 is inserted through the cutout section 54 and placed under the inner shell unit 44 lip 48. The top edge 50 of the locking handle 30 is then slipped over the outer surface 52 of the outer shell unit unit 42, as illustrated in FIG. 5. This action forces the inner shell unit 44 and the outer shell unit 42 to be locked together, preventing slippage of the absorbent unit 12 and providing convenient handles with which to transport the unit. The essential factor in the locking together of the two sections, is the compression of the sorbent unit 12 between the bottom surface 51 of the inner bottom region 55 of the outer shell 42 and the upper surface 53 of the base 57 of the inner shell unit 44. It should be evident that the top lip 48 of the inner shell 44 must be sufficiently spaced from the lower surface 59 of the upper section of the outer shell 42 so as to permit the locking handle 30 to exhibit its compressive force and lock the sorbent unit 12 in place before the top lip 48 can come into contact with the outer shell 42. Also seen in FIG. 5 is the importance of the matching contours of the locking handle 30 and the outer shell unit 42.

Figure 6:
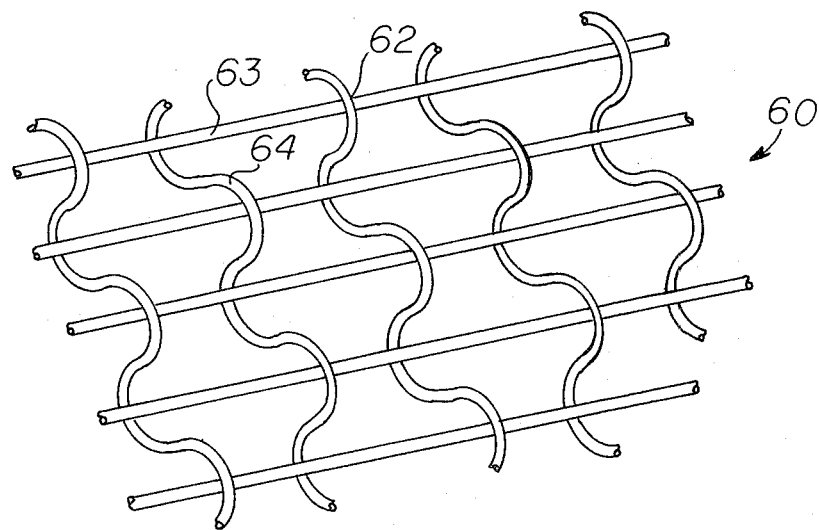
FIG. 6 is an enlarged fragmentary view of a screen for use with the instant invention.

FIG. 6 is an enlarged view of the ripproof screen 60. The screen is formed of strands 63 and 64 which are at right angles to each other as well known in the art. The instinct of cats to scratch at fabrics puts a heavy stress on the screen. The clawing action can separate the strands to the point that the sorbent material 70 which underlies the screen can become exposed to the claws and torn apart. It is essential that the urine is free to pass through the screen and any intermediate layers, such as a hydrophobic membrane and or one or more layers of tissue paper to the sorbent material. Therefore, neither the screen nor the intermediate layers can offer restriction to the urine flow except as well known for the hydrophobic membrane. For this reason, the screen must have sufficient porosity and or hydrophilicity such that beading of urine does not occur. The interstices of the cross strands are shown in FIG. 6, to be fused, as for example by means of heat. It has been found that this type of structure can withstand intense clawing without separation of strands. Thus the inner layers are protected from the claws of the cat. In this regard it is noted that the openings 14 of the screen 12 of FIG. 1, must represent a very high percent of the solid area 18 of the screen as compared to the area occupied by the solid area of the screen. The desired ratio has been found to be more reliably attainable with fiberglass screens having strands fused at their interstices than by any other means. It must be understood that the opening cannot be so large that the cat can claw at the underlying layers. It is this later fact which results in the difficulty in attaining the required porosity.

What is claimed is:

1. A container for use with a sorbent pad comprising, a self supporting structure having a base and four walls, sorbent pad laminate means for the collection of animal urine, comprising in combination;

a sorbent layer of material having a high absorbency capacity for urine;

screen means on the side of said sorbent layer opposite said base whereby said sorbent layer is protected from being torn by animal claws by said screen means, a lid member, said lid member having four inner walls and four outer walls spaced from said four inner walls and dimensioned to receive said fours walls of said self supporting structure between said four inner walls and said four outer walls, wherein said sorbent pad is positioned in said self supporting structure and is dimensioned such that it completely covers said base of said self supporting structure, said lid member being dimensioned such that the lower edge of said inner walls engages said sorbent pad laminate and compresses said laminate against said base, thereby providing securing means, for securing said sorbent pad to said self supporting container and preventing relative movement of said sorbent pad and said self supporting structure.

2. A container for use with an sorbent pad comprising, a self supporting structure having a base and four walls, sorbent pad laminate means for the collection of animal urine, comprising in combination:

a sheet layer of moisture impermeable material;

a sorbent layer of material having a high absorbency capacity for urine;

screen means on the side of said sorbent layer opposite said sheet layer, said screen means being a mesh having at least most of the mesh forming strands adhered to each other at the strand interstices;

whereby said sorbent layer is protected from being torn by animal claws by said screen means securing means, said securing means fixing said sorbent pad to said self supporting container and preventing relative movement of said sorbent pad and said self supporting structure;

and further comprising a lid member, said lid member having four inner walls and four outer walls spaced from said four inner walls and dimensioned to receive said fours walls of said self supporting structure between said four inner walls and said four outer walls;

and wherein said sorbent pad is positioned in said self supporting structure and is dimensioned such that it completely covers said base of said self supporting structure, said lid member being dimensioned such that the lower edge of said inner walls engages said sorbent pad laminate and compresses said laminate against said base, whereby said screen is restrained against movement which can be caused by the clawing action of an animal.

3. The container of claim 2, wherein said self supporting structure is made of paperboard.

4. The container structure of claim 2, further comprising locking means, said locking means serving to lock said self supporting structure against said lid member and compress said sorbent laminate there between.

5. The container structure of claim 4, wherein said locking means comprises an opening in each of two opposite outer walls, said self supporting structure having an outwardly extending flange extending from the upper edge of each of at least two walls, said two walls being positioned proximate said each of two opposite outer walls, and clamp means, said clamp means being positioned such that it has a first end which passes through said opening and engages the lower edge of an outwardly extending flange forcing said flange and said base outwardly and a second end which engages a top surface of said lid member forcing said lid member downwardly against said base member, whereby said sorbent laminate is clamped in the locked position precluding movement of said screen relative to said container structure.

6. The container structure of claim 5, wherein said clamp means has an essentially "C"-shaped cross section.

* * * * *